Patented Jan. 19, 1926.

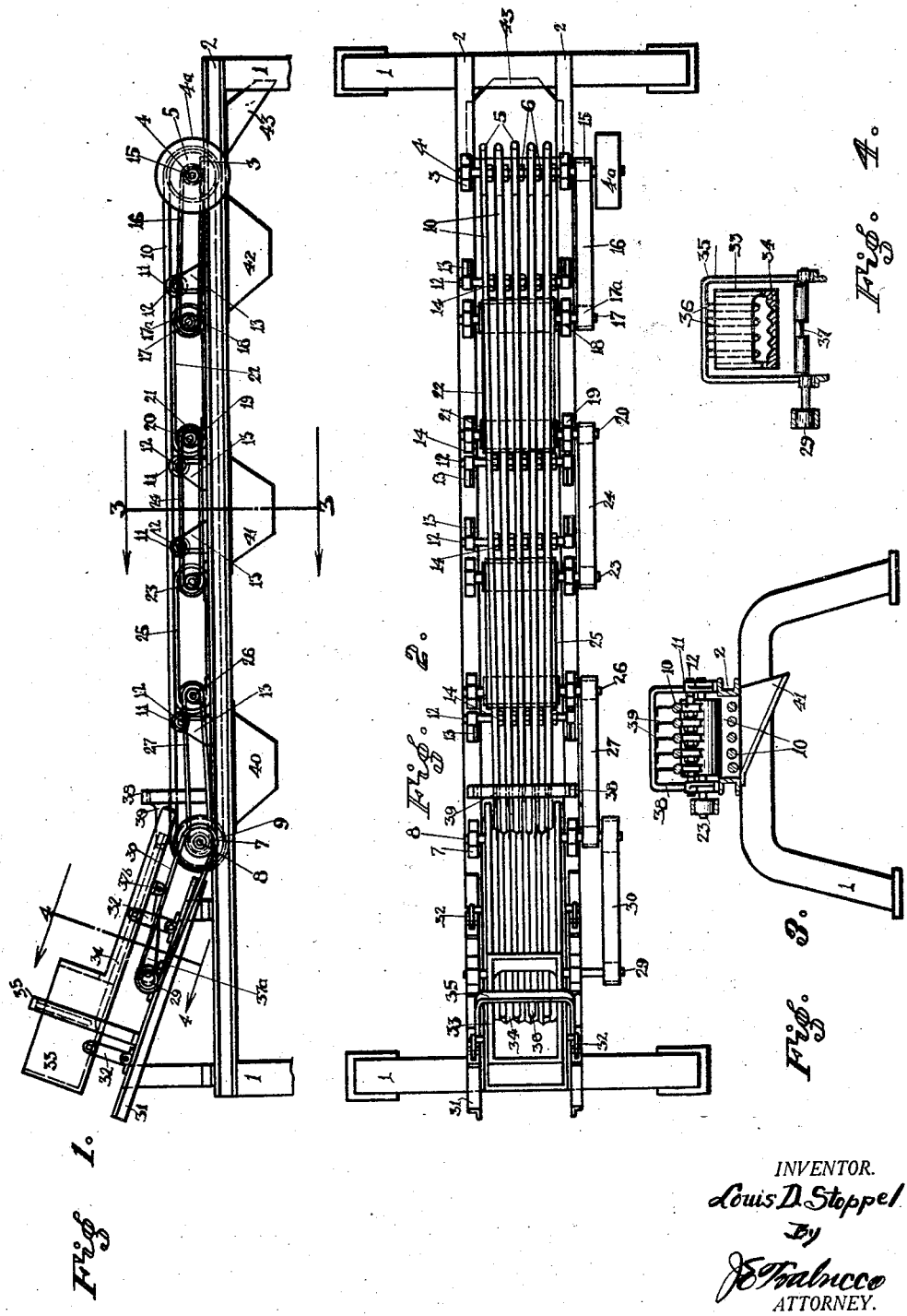

1,570,409

UNITED STATES PATENT OFFICE.

LOUIS D. STOPPEL, OF ISLETON, CALIFORNIA.

ASPARAGUS-ASSORTING MACHINE.

Application filed June 23, 1925. Serial No. 39,146.

*To all whom it may concern:*

Be it known that I, LOUIS D. STOPPEL, a citizen of the United States, residing at Isleton, in the county of Sacramento and State of California, have invented new and useful Improvements in Asparagus-Assorting Machines, of which the following is a specification.

This invention relates to asparagus assorting machines of the type adapted to separate the various sizes of asparagus stems into a number of groups.

An object of this invention is to provide an asparagus assorting machine for separating a quantity of asparagus stems into various groups.

Another object of this invention is to provide a novel means for automatically separating the smaller size asparagus stems from those having a larger size.

A further object of this invention is to provide a machine constructed and designed to automatically group asparagus stems according to their size.

A further object of this invention is to provide a convenient and economical means for automatically assorting asparagus stems into groups in which a number of particular size stems are assembled.

Further objects, more or less apparent, will be pointed out in the detailed description of the drawings, in which:

Fig. 1 illustrates a side view of an asparagus assorting machine embodying my invention;

Fig. 2 is a top view of the same;

Fig. 3 is a sectional view taken on the line 3—3 of Fig. 1; and

Fig. 4 is a sectional view taken on the line 4—4 of Fig. 1.

Referring to the drawings in which like numerals refer to the same parts throughout the several views, the numeral 1 designates a pair of supporting members to which is secured a side frame 2. Elevated and maintained above the side frame 2 by a pair of supports 3 and rotatably attached thereto, is a threaded axis rod 4 on which are screwed a plurality of end rollers 5, the same being spaced apart and held in place by nuts 6. The distance between the rollers 5 is regulated by screwing them along the axis rod 4 and fixing their location thereon by nuts 6. To the axis rod 4 is secured a pulley 4ª which is suitably attached to a source of power. Elevated and maintained above the side frame 2 near its central part by a pair of supports 7 is another threaded axis rod 8 on which are screwed a plurality of end rollers 9, the same being spaced apart and held in place by nuts similar to the nuts 6 which hold the rollers 5 in position on axis rod 4. Extending over the rollers 5 and 9 are a plurality of belts 10 which are actuated by rollers 5 when power is applied to pulley 4ª. Spaced between the rollers 5 and 9 are a plurality of rollers 11 mounted on threaded shafts 12 which are revolvably secured to supports 13 attached to frame 2 by suitable bolts and nuts. The rollers 11 are positioned on shafts 12 and held thereon by nuts 14. The rollers 11 are adapted to hold the belts 10 in place intermediate the rollers 5 and 9. Secured on shaft 4 is a pulley 15 which is connected by a belt 16 to a similar pulley 17ª, the latter being attached to shaft 17 which is revolvably mounted on supports 18 underneath belts 10. Supported on the frame 2 by supports 19 is shaft 20 to which is secured pulley 21 over which a wide belt 22 extends underneath the belts 10. The belt 22 extends over another pulley similar to pulley 21 which is mounted on shaft 17. The supports 18 and 19 are of sufficient height to cause the belt to move immediately underneath the belts 10. A shaft 23 similar to shaft 20 is connected to the latter by another belt 24, and another wide belt 25 similar to belt 22 is connected underneath the belts 10 to shafts 23 and 26. Shafts 26 and 8 are connected by belt 27, while shaft 8 is connected to shaft 29 by belt 30.

Mounted on the frame 2 is an inclined member 31 to which is movably supported and attached by bars 32 the box 33, suitable in size to hold a quantity of asparagus stems. Located along the bottom of box 33 on the inside thereof is a grooved piece 34 which assumes an inclined position similar to member 31. Supported around the box 33, on inclined members 31 is a bracket 35 which supports and holds pins 36 inside box 33. The pins 36 afford a means for preventing the asparagus stems in box 33 from moving down grooved piece 34 in excess quantities. The shaft 29 is provided with a raised central piece 37 which provides an eccentric movement for bar 37ª which is revolvably attached at one end to shaft 29 at 37, the other end of the bar being attached to the underneath side of grooved piece 34 by pin 37ᵇ. Attached to frame 2 is a supporting member 38 to which is attached guiding irons 39, the ends of which extend into the raised portions of the grooved piece 34 and serve to guide the asparagus stems passing from grooved piece 34 onto belts 10. Located between wide belts 23 and 25 are receptacles 40, 41 and 42 which are attached to the underneath part of frame 2.

In order to provide a means for permitting the smaller sized asparagus stems to drop into receptacle 40, a slightly larger size to drop into receptacle 41 and a still larger size to fall into receptacle 42, the rollers 9 are spaced closer together than are rollers 5. The belts 10, extending over the said rollers, are thereby made to assume a slightly diverged position in reference to their location on rollers 9 and rollers 5, thus permitting the larger asparagus stems to be carried along by the said belts and to drop into the said receptacles. The space between the belts 10, above receptacle 40, being comparatively narrow, permits only the smaller asparagus stems to drop into receptacle 40, the larger sizes being carried along by belts 25 and 10 to a point above receptacle 41 where a larger size is permitted to drop through the spaces between the belts 10 into receptacle 41, and a still larger size is carried beyond 41 by the said belts to receptacle 42 where a still larger size is permitted to drop through the spaces between belts 10 into the receptacle 42. In the event any of the asparagus stems are too large for passing through the spaces between the belts 10 at a point above the receptacle 42, they are carried along by the belts to a chute 43 where they drop into another container.

The gradual separation of belts 10 from the guiding irons 39 to the point where they extend above chute 43, enables the asparagus stems to be properly graded according to size, the belts 25 and 22 acting as a means for assisting the carrying of the larger stems along to the receptacles 41 and 42 located respectively at the ends of the said belts, where they are deposited.

In operation, a quantity of asparagus stems are placed in box 33, and are guided by an operator onto the grooves in grooved piece 34 between pins 36. Suitable power is applied to pulley 4ᵃ, and shafts 4, 17, 20, 23, 26, and 8 are made to revolve through the belts attached thereto. The eccentric motion delivered to the grooved piece 34 by shaft 29 and bar 37ᵃ shakes them down the inclined grooved piece 34 to the end thereof, where they fall onto belts 10. The smallest of the stems fall through the spaces between belts 10 into receptacle 40, and the larger ones are carried along by the said belts 10 to belt 25, which, together with belts 10, carries them to a point above receptacle 41, where stems of a larger size are permitted to drop between the spaces between the belts 10 into receptacle 41. Stems of a still larger size, not being permitted to drop into receptacle 41 are carried by belts 10 and 22 to a point above receptacle 42, into which another size of the stems drop. If any of the stems are too large to pass between the spaces between the belts 10 at this point, the same are carried along by belts 10 to the chute 43 through which they pass.

Having described my invention, what I claim is:

1. An asparagus assorting machine, comprising a frame, a plurality of rollers revolvably secured to the frame, a plurality of separated belts extending over the rollers for carrying asparagus stems, a plurality of belts extending entirely transversely underneath the first named belts and over a plurality of rollers revolvably secured to the frame, for carrying some of the larger asparagus stems along and for preventing them from falling between the separated belts at certain intervals, a plurality of containers attached to the frame and located beneath the first named belts, means for delivering asparagus stems to the upper surface of the first named belts, and means for moving the said belts and rollers.

2. An asparagus assorting machine, comprising a frame, a plurality of separated rollers revolvably attached to the frame, a plurality of belts extending over the rollers whereby asparagus stems may be carried thereby, a plurality of belts located at intermediate distances beneath the first named belts and extending over rollers revolvably attached to the frame whereby some of the larger asparagus stems are prevented from falling between the first mentioned belts, and a plurality of receptacles located beneath the first mentioned belts at points between the second mentioned belts.

3. An asparagus assorting machine, comprising a frame having a motor driven shaft revolvably attached thereto, a plurality of separated rollers attached to the shaft and having a plurality of belts extending over the same and over the rollers, whereby asparagus stems may be carried, means for guiding asparagus stems onto the first mentioned belts, and a plurality of belts each located at stated intervals beneath the first mentioned belts and operated by the power-driven shaft, whereby some of the asparagus stems are carried along and prevented from dropping between the first mentioned belts.

4. An asparagus assorting machine, comprising a frame having a driving shaft rotatably secured thereto, a plurality of separated rollers secured to the shaft and connected to a plurality of similar rollers by a plurality of separated belts, a plurality of belts located at specified intervals beneath the first named belts and actuated by the driving shaft, whereby asparagus stems of certain size are prevented from falling between the separated belts, means for delivering asparagus stems into the first named belts, and means located intermediate the second named belts for collecting asparagus stems passing between the spaces between the first named belts.

5. An asparagus assorting machine, comprising a frame having a driving shaft rotatably attached thereto, a plurality of separated belts actuated by the driving shaft whereby asparagus stems may be carried, a plurality of belts located at specified intervals beneath the belts for assisting the carrying along and the preventing of some of the said asparagus stems from dropping through the spaces between the belts, and means for collecting asparagus stems dropping through the spaces between the belts.

6. An asparagus assorting machine, comprising a frame having a driving shaft rotatably secured thereto, a plurality of separated belts actuated by the driving shaft whereby asparagus stems may be carried, a plurality of belts located at specified intervals beneath the belts for preventing some of the asparagus stems from passing through the spaces between the belts, and for assisting the carrying of them along, and means for delivering asparagus stems to the belts.

7. An asparagus assorting machine comprising a frame having a plurality of rollers rotatably attached thereto, a plurality of separated belts extending over the rollers whereby asparagus stems may be carried, a plurality of moveable belts located at specified intervals beneath the first named belts for preventing asparagus stems from passing through the spaces located between the belts at the said intervals, means for collecting asparagus stems dropping through the spaces between the belts, and means for actuating the belts.

8. An asparagus assorting machine, comprising a frame having a plurality of moveable separated belts attached thereto, whereby asparagus stems may be carried, a plurality of belts moveably located at specified intervals on the frame beneath the first named belts for preventing asparagus stems from dropping through the spaces between the belts, means for delivering asparagus stems to the belts, and means for actuating the belts, the first named means and the last named means.

9. An asparagus assorting machine comprising a frame having means for delivering asparagus stems to a plurality of separated belts moveably attached to the frame, a plurality of moveable belts located at specified intervals on the frame for preventing asparagus stems from dropping through the spaces between the belts and for assisting the conveyance of the asparagus stems by the belts, and means for actuating the belts and the means.

LOUIS D. STOPPEL.